W. KÖHLER.
CURRENT COLLECTOR FOR ELECTRICALLY PROPELLED VEHICLES.
APPLICATION FILED MAR. 17, 1910.
973,672.
Patented Oct. 25, 1910.
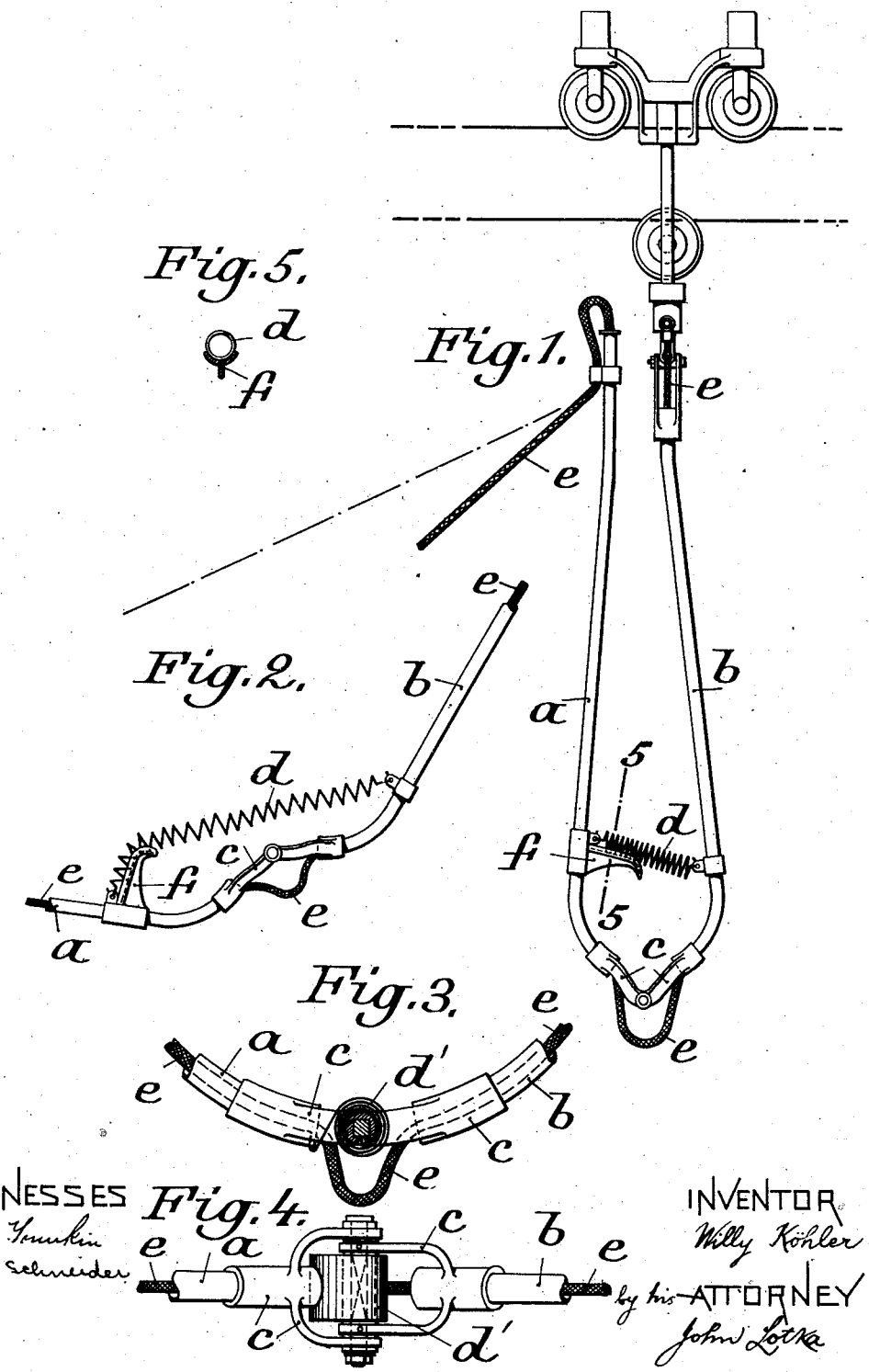

UNITED STATES PATENT OFFICE.

WILLY KÖHLER, OF BREMEN, GERMANY.

CURRENT-COLLECTOR FOR ELECTRICALLY-PROPELLED VEHICLES.

973,672.  Specification of Letters Patent.  Patented Oct. 25, 1910.

Application filed March 17, 1910. Serial No. 550,007.

*To all whom it may concern:*

Be it known that I, WILLY KÖHLER, a subject of the German Emperor, residing at 41/43 Obernstrasse, Bremen, Germany, have invented certain new and useful Improvements in Current-Collectors for Electrically-Propelled Vehicles; and I do hereby declare the following to be a full, clear, and exact description of the invention, such as will enable others skilled in the art to which it appertains to make and use the same.

The invention relates to the electrical propulsion from overhead conductors of vehicles, such as tram-cars or canal barges which travel without a track. It must be possible for the vehicle to make considerable lateral deviations from the direction of the overhead conductor in order to prevent collisions with other vehicles or with obstacles. On this account the current collector may occasionally be subject to considerable lateral stress, and even if the collector is sufficiently secure against disengagement from the conductor there is always a considerable distortion of the latter.

According to this invention a spring member is inserted between the overhead conductor and the current collector, which not only easily and quickly allows of the necessary lengthening or shortening of the connecting cable, but also prevents the sudden development of dangerous tension. According to the invention this intermediate spring member is preferably formed as a loop consisting of two rigid arms pivoted together and drawn toward each other by a spring.

In the accompanying drawings Figure 1 is an elevation of the cable loop in operative connection with a current collector, Fig. 2 is a view of the cable loop when extended, Figs. 3 and 4 are an elevation and a plan respectively of a modified construction and Fig. 5 is a section on line 5—5 of Fig. 1.

The tubes or arms $a$ and $b$ constitute the two sides of the loop and are slightly curved at their lower ends which are inserted in tubular sockets carried by the joint $c$. At a suitable point on each tube is an eye and the two eyes are connected together by a helical spring $d$, which therefore tends to bring the loop into the form shown in Fig. 1. The conducting cable $e$ is drawn through the two tubes, sufficient slack being left to form a loop at the joint $c$, so as to give freedom of movement.

In order to prevent overstretching of the cable loop or to prevent the loop from becoming ineffective, one of the tubes, say $a$, may have a bracket $f$ fixed to it, of the cross section drawn to an enlarged scale in Fig. 5. The trough of the bracket bears against the spring $d$ so that this becomes curved when the loop is extended and is always operative to bring the tubes back in the right direction.

The modified form shown in Figs. 3 and 4 has a spiral spring $d'$ instead of the helical spring $d$; such a spring always operates in the same direction and so always tends to bring the loop back to its normal form even if the extension of the loop is so great that the two points of attachment and the pivot are brought into a straight line.

Having now particularly described and ascertained the nature of my said invention and in what manner the same is to be performed, I declare that what I claim is:

1. In combination with a traveling current collector, a connecting cable leading from said collector and formed with a loop, and a spring tending to close said loop.

2. In combination with a traveling current collector, a connecting cable leading from said collector and formed with a loop, rigid arms movable toward and from each other and connected with portions of said loop, and a spring tending to draw said arms together.

3. In combination with a traveling current collector, a connecting cable leading from said collector and formed with a loop, rigid arms connected with portions of said loop and pivoted to one another, and a spring tending to draw said arms together.

4. In combination with a traveling current collector, a connecting cable leading from said collector and formed with a loop, tubes movable toward and from each other and containing portions of said cable, and a spring tending to draw said tubes together.

5. In combination with a traveling current collector, a connecting cable leading from said collector and formed with a loop, tubes containing portions of said cable and pivoted to one another, and a spring tending to draw said tubes together.

6. In combination with a traveling current collector, a connecting cable leading from said collector and formed with a loop, tubes containing portions of said cable and pivoted to one another, and a helical spring attached to both tubes so as to draw them toward each other.

7. In combination with a traveling current collector, a connecting cable leading from said collector and formed with a loop, tubes containing portions of said cable and pivoted to one another, a helical spring attached to both tubes to draw them toward each other, and a bracket on one of the tubes adapted to engage the spring when the loop is extended.

8. In combination with a traveling current collector, a connecting cable leading from said collector and formed with a loop, arms movable toward and from each other and connected with portions of said loop, and a helical spring attached to both arms so as to draw them toward each other.

9. In combination with a traveling current collector, a connecting cable leading from said collector and formed with a loop, arms movable toward and from each other and connected with portions of said loop, a helical spring attached to both arms so as to draw them toward each other, and a bracket on one of the arms adapted to engage the spring when the loop is extended.

10. The combination with a traveling current collector, of a current conductor leading from said collector and provided with means for forming in said conductor a loop having a tendency to close elastically.

In testimony, that I claim the foregoing as my invention, I have signed my name in presence of two subscribing witnesses.

WILLY KÖHLER.

Witnesses:
    FRIEDRICH SCHMIDT,
    FRIEDRICH HOYERMANN.